US 12,426,554 B2

(12) United States Patent
Cowburn et al.

(10) Patent No.: US 12,426,554 B2
(45) Date of Patent: Sep. 30, 2025

(54) AIR TREATMENT METHOD AND SYSTEM

(71) Applicant: New Earth Solutions Inc., Toronto (CA)

(72) Inventors: Mitchell Cowburn, Guelph (CA); Dylan Robertson, Guelph (CA); Tristan Zimmerman, Guelph (CA); Ben Tory-Pratt, Toronto (CA)

( * ) Notice: Subject to any disclaimer, the term of this patent is extended or adjusted under 35 U.S.C. 154(b) by 288 days.

(21) Appl. No.: 17/838,610

(22) Filed: Jun. 13, 2022

(65) Prior Publication Data

US 2022/0304248 A1 Sep. 29, 2022

Related U.S. Application Data

(63) Continuation of application No. PCT/CA2020/051606, filed on Nov. 25, 2020.

(60) Provisional application No. 62/947,936, filed on Dec. 13, 2019.

(51) Int. Cl.
*A01G 24/48* (2018.01)
*A01G 9/02* (2018.01)
*A01G 24/46* (2018.01)

(52) U.S. Cl.
CPC .............. *A01G 24/48* (2018.02); *A01G 9/025* (2013.01); *A01G 24/46* (2018.02)

(58) Field of Classification Search
CPC ......... A01G 24/46; A01G 24/48; A01G 9/025
See application file for complete search history.

(56) References Cited

U.S. PATENT DOCUMENTS

| | | | |
|---|---|---|---|
| 6,727,091 B2 | 4/2004 | Darlington | |
| 7,243,460 B2 | 7/2007 | Darlington | |
| 7,374,399 B2 | 5/2008 | Grinbergs | |
| 7,627,983 B1 | 12/2009 | Deutsch-Aboulmahassine | |
| 9,226,457 B2 | 1/2016 | Laurence et al. | |
| 9,445,557 B2 | 9/2016 | Darlington | |
| 9,462,755 B1 | 10/2016 | Corragio et al. | |
| 2003/0224507 A1 | 12/2003 | Darlington | |
| 2005/0097871 A1 | 5/2005 | Glassman | |
| 2007/0199241 A1 | 8/2007 | Peleszezak | |
| 2012/0279126 A1* | 11/2012 | Simmons | A01G 31/06 47/62 A |
| 2013/0180172 A1 | 7/2013 | Silverberg | |

(Continued)

FOREIGN PATENT DOCUMENTS

| | | |
|---|---|---|
| CA | 2482032 C | 3/2012 |
| CN | 103250583 A | 8/2013 |

(Continued)

*Primary Examiner* — Joshua D Huson
*Assistant Examiner* — Edgar Reyes

(57) ABSTRACT

A living wall system or method involving a plurality of living wall modules. Each living wall module has a module body enclosing a module plenum, the module body having a growth media port and at least one duct port in fluid communication with the growth media port via the module plenum. The plurality of module plenums are interconnected through the plurality of duct ports to form a recirculation plenum. At least one directional blower is received within the recirculation plenum, the at least one directional blower between at least one upstream living wall module and at least one downstream living wall module to direct fluid flow from the at least one upstream living wall module to the at least one downstream living wall module.

20 Claims, 8 Drawing Sheets

(56) References Cited

U.S. PATENT DOCUMENTS

2014/0109473 A1\* 4/2014 Sung ..................... A01G 9/022
  47/39
2015/0289452 A1 10/2015 Axley et al.

FOREIGN PATENT DOCUMENTS

| | | |
|---|---:|---|
| CN | 103621348 A | 3/2014 |
| EP | 1500883 A2 | 1/2005 |
| EP | 2493282 B1 | 4/2014 |
| EP | 3539371 A1 | 9/2019 |
| FR | 2968891 A1 | 6/2012 |
| GB | 2394664 B | 9/2005 |
| JP | 5085378 B2 | 11/2012 |
| JP | 2014064517 A | 4/2014 |
| KR | 101074329 B1 | 10/2011 |
| KR | 101074931 B1 | 10/2011 |
| KR | 101074994 B1 | 10/2011 |
| KR | 1020140074132 A | 6/2014 |
| KR | 101968674 B1 | 11/2019 |
| TW | 20438566 A | 10/2014 |
| WO | 2011019277 A2 | 2/2011 |
| WO | 2011117437 A1 | 9/2011 |
| WO | 20120845439 A1 | 6/2012 |
| WO | 2014097660 A1 | 6/2014 |
| WO | 2015045087 A1 | 4/2015 |
| WO | 2017118814 A1 | 7/2017 |

\* cited by examiner

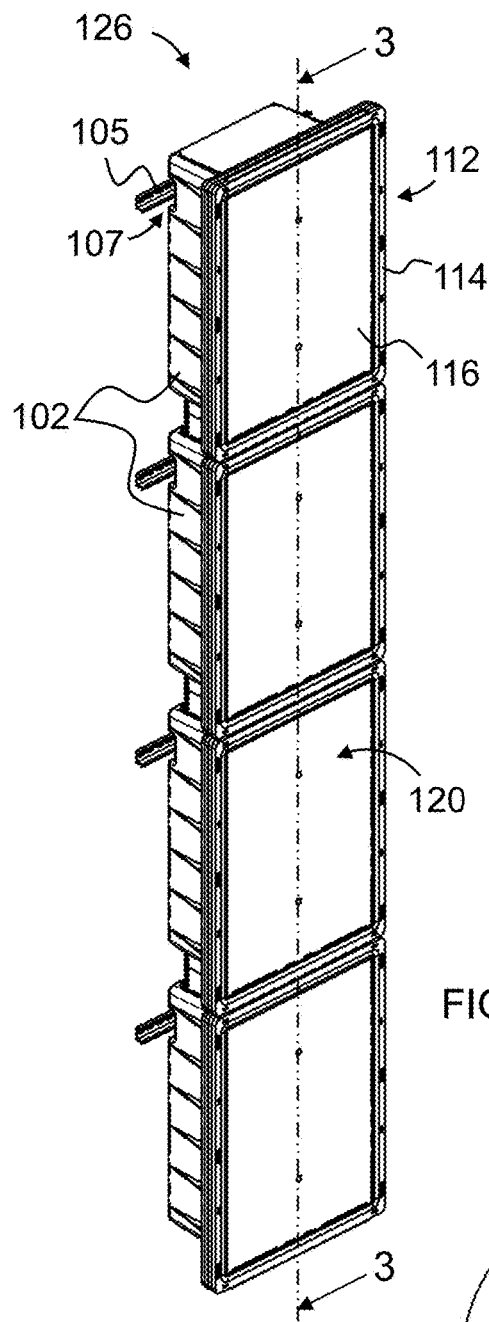
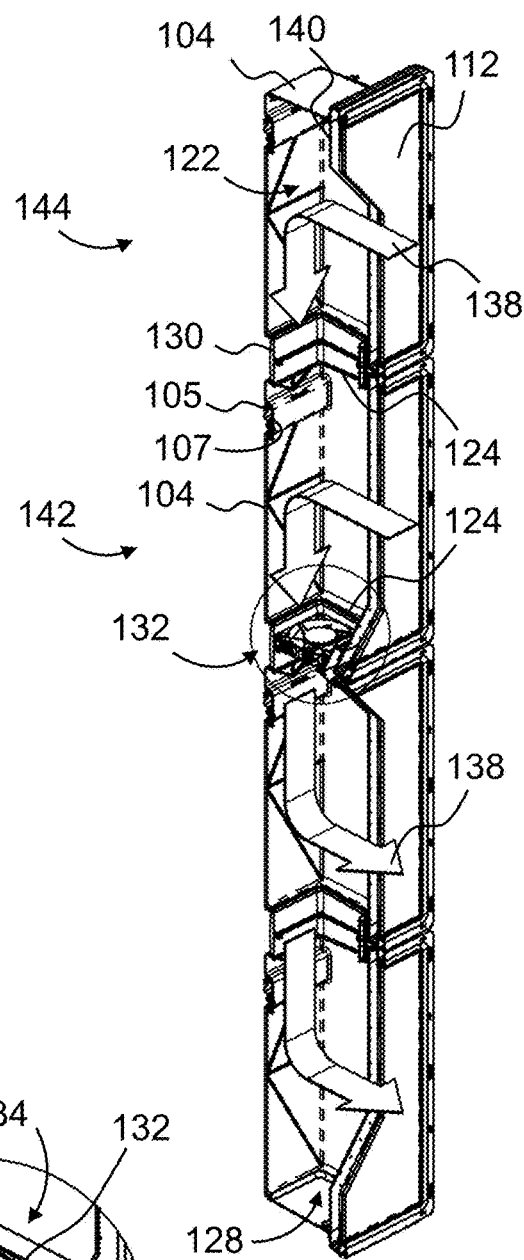
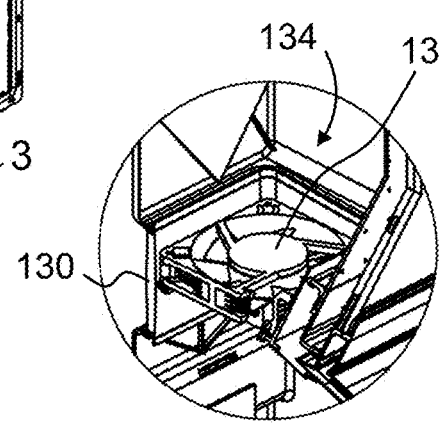
FIG. 2
FIG. 3
FIG. 4

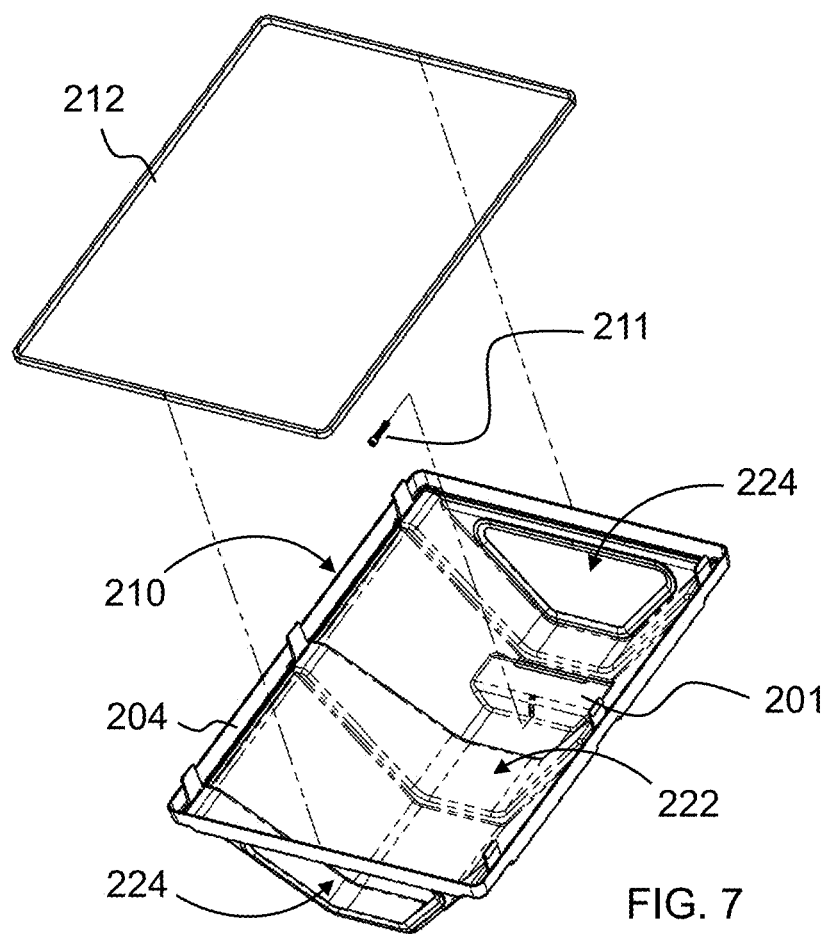
FIG. 7
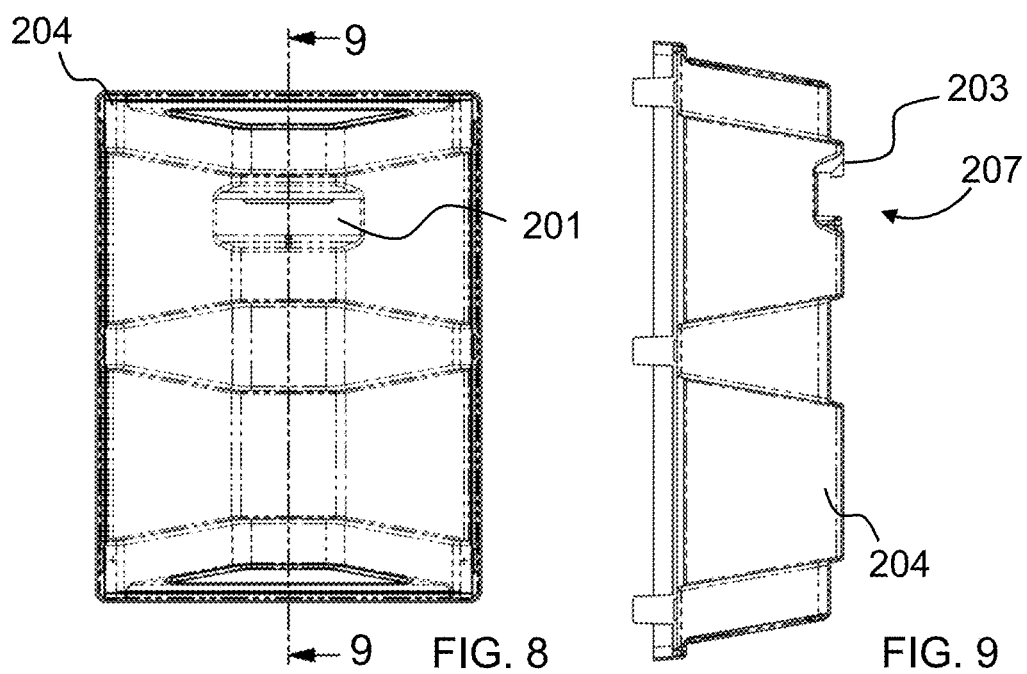
FIG. 8
FIG. 9

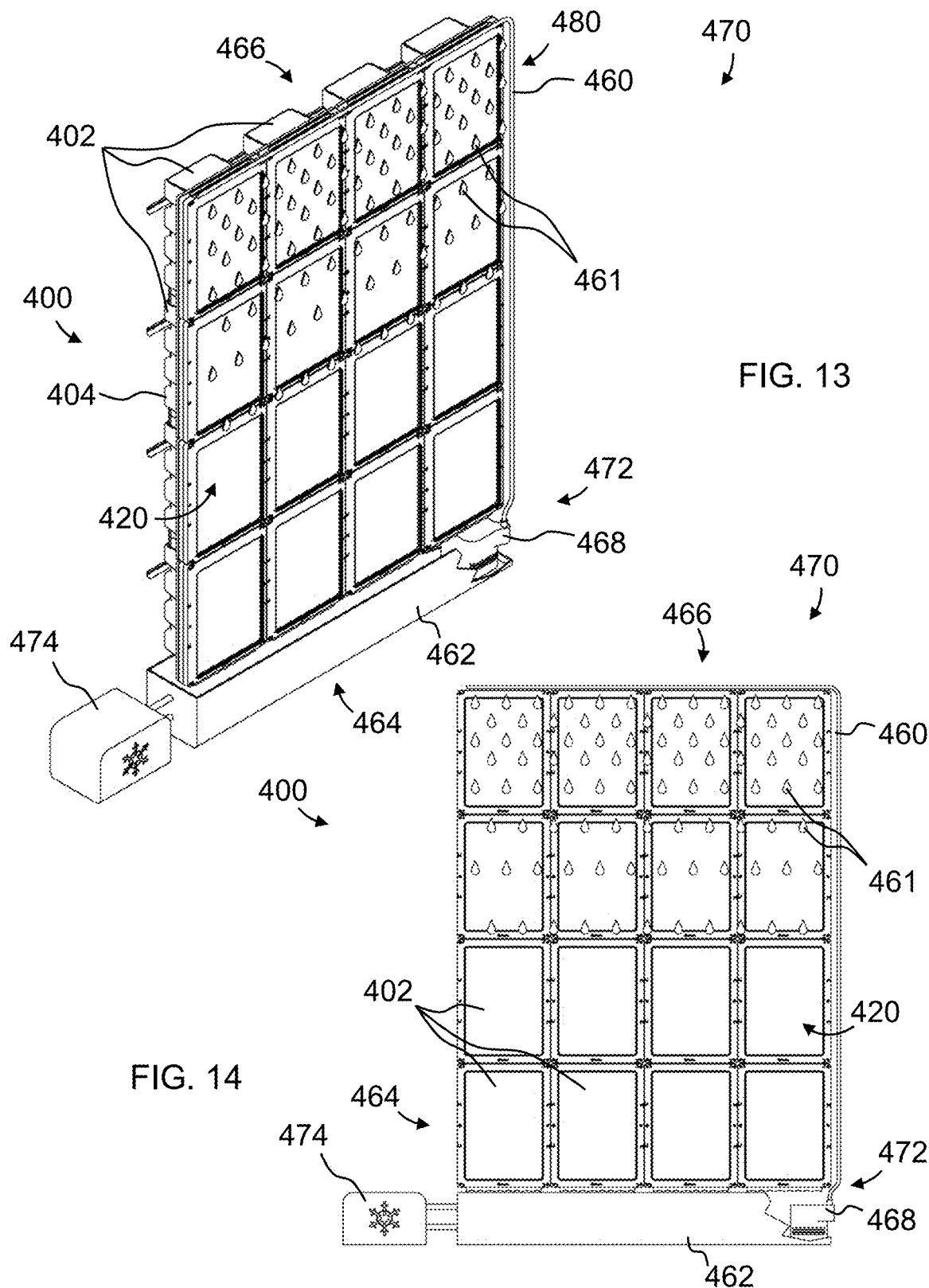

500 ↘

| Adjusting a temperature of a liquid | ~502 |

↓

| Adding the liquid to growth media | ~504 |

↓

| Moving air through the growth media | ~506 |

FIG. 15

AIR TREATMENT METHOD AND SYSTEM

FIELD

The specification relates generally to apparatus and methods associated with treating air, and more specifically, to apparatus and methods associated with a living wall having a plurality of living wall modules.

BACKGROUND

U.S. Pat. No. 6,727,091 purports to disclose plants disposed on a near-vertical matrix panel of porous or fibrous inert material, in which the roots of the plants are embedded. Hydroponic water trickles down the panel, keeping the roots wet. A fan draws the air to be treated horizontally through the panel. The unit freshens stale air in a room. It may be provided as a wall-mounted unit, or as a self-standing tower unit.

International Patent Application No. PCT/JP2013/059270 purports to disclose a wall surface greening and atmosphere purification device that takes the form of a wall panel having a plant growing substrate on one surface of which plants are planted, and a permeation layer forming material that forms a permeation layer along the other surface of the plant growing substrate. A permeable member is interposed between the plant growing substrate and the permeation layer. Within the plant growing substrate is interposed a water permeable intra-compartment soil support member that partitions the plant growing substrate into a plurality of compartments and supports the load of soil within the compartments. Each compartment of the plant growing substrate may be used as individual greening units.

International Patent Application No. PCT/FR2011/053074 purports to disclose a green wall comprising a structure composed of juxtaposed and/or superposed boxes. Each box has a frame which supports wire-netting or chain-link faces. The boxes are filled with a planting substrate for the plants growing at least on their front faces. An air distribution network connected to a pump supplies air through the thickness of the boxes, and therefore into the interior of the planting substrate. This network comprises, in a manner disposed vertically inside each box, an air distribution plenum connected to a forced-air supply duct, the plenum having an air diffusion window or grille. The invention is applied to the production of a depolluting green wall.

International Patent Application No. PCT/JP2013/076198 purports to disclose a plant growth base and a support body for supporting the load of the plant growth base and dividing the plant growth base into a plurality of divided growth bases which are provided in a greening frame. Vent layers having vent ports opening on the reverse surface, which is on the opposite side from a plant growth surface, of the divided growth bases are formed by vent layer formation boxes disposed outside the greening frame and attached to the greening frame. The vent ports of the vent layers are smaller than the reverse surfaces of the divided growth bases. The portions of the reverse surfaces of the divided growth bases other than the portions facing the vent ports are shielded by parts of the vent layer formation boxes or separate shielding members.

SUMMARY

The following summary is intended to introduce the reader to various aspects of the applicant's teaching, but not to define any invention.

According to some aspects, there is provided a living wall system for supporting living plants.

According to some aspects, there is provided a living wall system, comprising a plurality of living wall modules, each living wall module having a module body enclosing a module plenum, the module body having a growth media port and at least one duct port in fluid communication with the growth media port via the module plenum, the plurality of module plenums interconnected through the plurality of duct ports to form a recirculation plenum; growth media mounted to the living wall module for supporting living plants, the growth media disposed between the growth media port and ambient air in an environment external the living wall module; and at least one directional blower received within the recirculation plenum, the at least one directional blower mounted between at least one upstream living wall module and at least one downstream living wall module to draw the ambient air through the growth media and growth media port of the upstream living wall module into the recirculation plenum, and to expel air from the recirculation plenum to the environment through the growth media port and growth media of the downstream living wall module.

In some examples, the living wall system further comprises a growth media panel mounted to each module body and at least partially covering the growth media port, the growth media supported by the growth media panel.

In some examples, the at least one directional blower is at least one electric fan received in at least one of the duct ports.

In some examples, the recirculation plenum is fluidly sealed except for the plurality of growth media ports.

In some examples, each module plenum is fluidly sealed except for the growth media port and the at least one duct port.

According to some aspects, there is provided a living wall system, comprising a plurality of living wall modules, each living wall module including a module body enclosing a module plenum, the module body having a growth media port and at least one duct port in fluid communication with the growth media port via the module plenum, a damper panel defining a throughput aperture area between the growth media port and the at least one duct port, the plurality of module plenums interconnected through the plurality of duct ports to form a recirculation plenum; and a blower in fluid communication with the recirculation plenum, the plurality of living wall modules including a proximate portion a proximate fluid flow distance from the blower and a distal portion a distal fluid flow distance from the blower, the distal fluid flow distance being greater than the proximate fluid flow distance, the proximate portion having a proximate portion throughput aperture area that is smaller than a distal portion throughout aperture area of the distal portion.

In some examples, each damper panel of the plurality of living wall modules is a planar panel closing the module plenum between the growth media port and the at least one duct port, and the throughput aperture area of each living wall module is defined by a set of apertures in the damper panel.

In some examples, the apertures of the set of apertures of the adjacent living wall module are smaller than the apertures of the set of apertures of the distal living wall module.

In some examples, the apertures of the set of apertures of the adjacent living wall module are less numerous than the apertures of the set of apertures of the distal living wall module.

According to some aspects, there is provided a living wall system, comprising a first living wall module having a first module body forming a first module plenum, the first module plenum having a first growth media port and a first duct port, the first duct port having a first duct port engaging surface; a second living wall module having a second module body forming a second module plenum, the second module plenum having a second growth media port and a second duct port, the second duct port having a second duct port engaging surface; and a system coupling joining the first duct port and the second duct port for joining the first module plenum and the second module plenum into a recirculation plenum, the system coupling having a coupling body having a first coupling engaging surface for interfacing with the first duct port engaging surface and a second coupling engaging surface for interfacing with the second duct port engaging surface, and at least one of the first coupling engaging surface and the first duct port engaging surface being a first impact absorbing surface, and at least one of the second coupling engaging surface and the second duct port engaging surface being a second impact absorbing surface.

In some examples, the system coupling includes a section of ducting extending between a first end port and a second end port, each of the first and second end ports having a port interface coated with an elastic vibration dampening material.

According to some aspects, there is provided a growth media panel, comprising a first polyether foam growth layer having a first porosity; a second polyether foam growth layer having a second porosity greater than the first porosity; and wherein the first and second polyether foam growth layers are each planar and are layered in a co-planar arrangement.

In some examples, the growth medial panel further comprises a third polyether foam growth layer having a third porosity lesser than the second porosity, and the second polyether foam growth layer is sandwiched between the first and third polyether foam growth layers, and the first, second, and third polyether foam growth layers are each planar and the growth media panel is also planar.

In some examples, the growth media panel is supported along a periphery of the growth media panel by a growth frame, the growth frame including at least one fastener to join the frame to a living wall module.

According to some aspects, there is provided a living wall system for controlling humidity, comprising a living wall face including growth media for supporting plant roots; a housing supporting the living wall face and, together with the living wall face, enclosing a recirculation plenum behind the living wall face; a blower in fluid communication with the recirculation plenum to move air through the living wall face; an irrigation system to deposit water on the living wall face, the irrigation system including: a reservoir to hold the water, a conduit system from the reservoir to the living wall face, a pump to move the water out of the reservoir and through the conduit system to the living wall face; and a temperature control unit in thermal communication with the water in the reservoir to selectively cool or warm the water in the reservoir.

In some examples, the temperature control unit includes a chiller operable to cool the water in the reservoir.

According to some aspects, there is provided a method of modifying air in a space, comprising (a) operating a living wall system in a dehumidifying mode by (i) chilling water to a water temperature that is below a dew point of the air; (ii) after step (i), passing the water through a growth media of a living wall system; and (iii) during step (ii), moving the air through the growth media of the living wall system and back into the space.

In some examples, step (i) includes using a selectively activated temperature control unit in thermal communication with the water to chill the water, the temperature control unit selectively operable to chill the water when activated or to warm the water when activated, step (ii) includes using an irrigation system of the living wall system to pump the water out of a reservoir and onto the growth media, the irrigation system including a selectively activated pump operable to pump water out of the reservoir when activated, and step (iii) includes using a selectively activated blower to move air through the growth media when activated, the blower in fluid communication with a recirculation plenum behind the growth media, and wherein the method further comprises operating the living wall module in a further mode in which the temperature control unit is deactivated, the temperature control unit is activated and operated to warm the water, the pump is deactivated and the irrigation system is not pumping water onto the growth media, and/or the blower is deactivated and not moving air through the growth media.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 2 is a front perspective view of a column of the living wall system of FIG. 1;

FIG. 3 is a cross sectional view of the column of FIG. 2, taken along line 3-3 of FIG. 2;

FIG. 4 is an enlarged perspective view of a portion of FIG. 3;

FIG. 7 is an exploded view of a module body and growth media assembly of the living wall module of FIG. 5;

FIG. 8 is a front elevation view of the module body of the living wall module of FIG. 5;

FIG. 9 is a cross sectional view of the module body of FIG. 5, taken along line 9-9 of FIG. 8;

FIG. 13 is a front perspective view of a growth media system;

FIG. 14 is a front elevation view of the growth media system of FIG. 13; and

FIG. 15 is a flow chart of a method of reducing humidity of air in a space.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
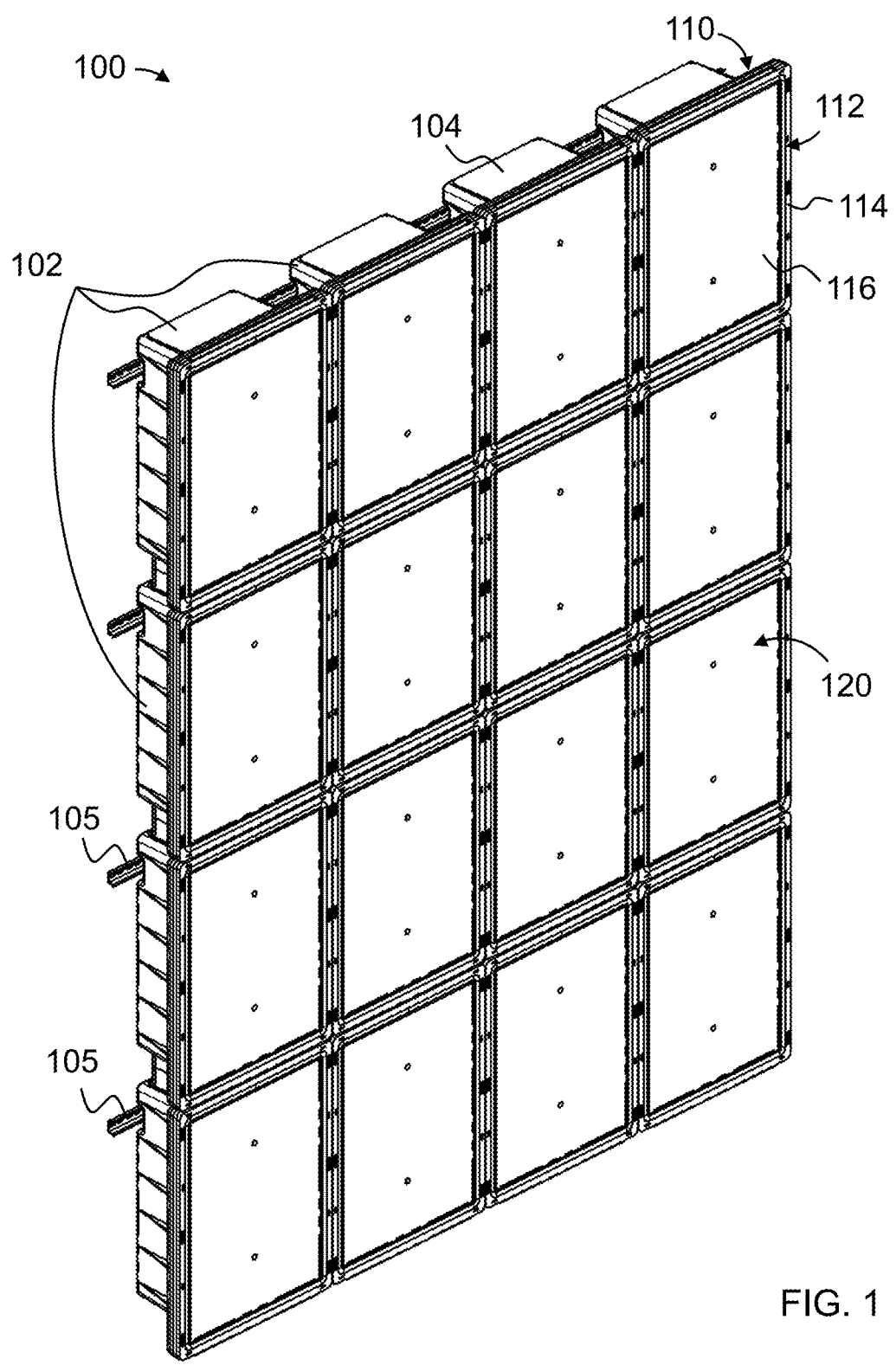
FIG. 1 is a front perspective view of a living wall system.

Referring to FIG. 1, an example of a living wall system 100 for filtering air includes a plurality of living wall modules 102. Each living wall module 102 has a module body 104, such as an injection molded plastic body. Each module body has a growth media port 110 in a front face (see also FIGS. 2 and 3). In the illustrated example each growth media port 110 is closed by a growth media assembly 112.

Illustrated growth media assemblies 112 each include a frame 114 which may be releasably coupled to module body 104 around a perimeter of growth media port 110. Frame 114 may be formed of, for example, a hard plastic. Frame 114 supports a growth media panel 116 to close off the growth media port 110. Air may pass through the growth media panel 116 held by perimeter frame 114 to enter or exit the living wall system 100. Growth media panel 116 may bear one or more plants, with the roots of each plant supported by growth media. The living wall system 100 forms a living wall face 120, and when one or more plants extend from growth media panel 116 the living wall face 120 may have the appearance of a continuous wall of plants. Plants may be grown on a media panel in-situ, or pre-grown on a media panel before the media panel is supplied to be attached to a growing frame. Plants may also be installed into a media panel.

Each module 102 of the illustrated embodiment hangs from a rail 105. In the illustrated embodiment, multiple modules 102 hang from each rail 105, however in other embodiments each module 102 may have a separate rail.

Rails 105 may be mounted to walls of a room or other environment. For example, Rails 105 may be secured to a wall by way of fasteners such as threaded fasteners, nails, clamps or other fasteners. Modules 102 may be secured to rails 105 by hanging from the rails and/or being fastened to the rails 105 by fasteners. For example, a module body 104 may have a recess 107 (FIG. 3) formed in a rear of the module body 104 to receive rail 105 so that module body 104 may hang from the rail 105. Modules 102 secured to rails 105 may have the appearance of floating off of a ground of a room or other environment.

In the illustrated example, a system is shown with four columns of modules 102, each column having four rows. However, the module nature of system 100 allows modules to be added or subtracted, such as by adding a module to an existing row or column or adding a row or column to a system, to result in any system having two or more modules. In some embodiments, a module may also be used alone. Modules may be sized to allow a plurality of modules to fit on a wall of a room, such as to allow at least four modules to be formed into a column in a room having a height of 2.5 meters. In some embodiments, a module has a greater height than width.

In some embodiments, a module or system of modules is used with a blower such as a fan. Additional blowers may be added to accommodate a larger system 100, such as a blower or blower assembly provided for each predetermined number of modules 102 or predetermined total area of a living wall face 120 or minimum total throughput area of the modules 102. For example, a blower or blower assembly may be added for every 2 to 5 modules or for every 3 or 4 modules.

Referring to FIGS. 2 and 3, each module body 104 encloses a module plenum 122. Each module body 104 includes at least one duct port 124. The at least one duct port 124 is in fluid communication with the growth media port 110 via the module plenum 122, to allow air to move between growth media port 110 and other modules joined to a give module via the one or more duct port 124.

In the illustrated example, modules 102 at the top and bottom of a column 126 of modules 102 each have a single duct port 124, while the other modules have two duct ports 124. In some embodiments, each module 102 has at least two duct ports 124, and unused duct ports may be closed by a stopper such as a snug-fit cap made of a similar material to that of the module body 104. In some embodiments, one or more modules has a duct port 124 in a rear of the module and/or a duct port 124 in a side of the module.

In the illustrated example, each module 102 has a top and/or a bottom duct port 124 for joining to one or more other modules 102 at a top and/or bottom. In other embodiments, a module may have more duct ports and/or alternative positions of duct ports. For example, in some embodiments, a module 102 may also or alternatively have a duct port 124 in one or more side panels of module body 104. In some embodiments, a module 102 may also or alternatively have a duct port 124 in a rear panel of module body 104. In some embodiments, one or more duct ports 124 may connect to external ducting rather than to another module 102, for example a duct port 124 may connect through a duct to an HVAC system of a building in which the module wall system in located. In some embodiments, a module 102 is not directly connected to another module 102, and duct port or ports 124 only connect to external ducting.

In the illustrated example, living wall modules 102 are arranged in interconnected columns 126. Each column 126 includes four living wall modules 102, and the each of the four module plenums 122 is interconnected through the plurality of duct ports 124 to form a recirculation plenum 128. Recirculation plenum 128 allows air to move between modules 102 of the column 126. In the illustrated embodiment, each pair of adjacent duct ports 124 is joined by a coupling 130.

Living wall system 100 also includes a directional blower 132 in each column 126 of interconnected living wall modules 102. A directional blower received within the recirculation plenum 128 may direct air from one module 102 to another module 102.

A directional blower in the recirculation plenum may draw a flow of fluid from an ambient environment, such as a stream of air from a room, through growth media of an upstream living wall module 102. The directional blower in the recirculation plenum may also push the flow of fluid through growth media of a downstream living wall module 102, thereby moving the flow of fluid through growth media twice to recirculate fluid of the ambient environment. Fluidly closing the system 100 and/or column 126 from an ambient environment except for the growth media ports 110 may further improve the efficiency of the recirculation.

Referring to FIG. 4, in the illustrated embodiment blower 132 is part of a blower assembly 134. Blower assembly 134 includes at least one blower 132 (e.g. a fan) mounted in a coupling 130 to direct air through the coupling 130. With blower assembly 134 mounted between two upstream modules 102 and two downstream modules 102, blower assembly 134 may be used to induce a fluid flow 138 (FIG. 3) through the modules.

Fluid flow 138 in the illustrated example moves in through upstream modules 102 in an upper part of column 126 and out through downstream modules 102 in a lower part of column 126. In other embodiments, a fluid flow may be directed in an alternate path, such as in an opposite direction. A movement of fluid from upper modules 102 to lower modules 102 may take advantage of natural air movement. For example, fluid flow 138 may be a flow of air in a room, and the air may be cooled (e.g. transpiration cooling) as it passes near plants that are growing on or in system 100. Air that is cooled as it passes through system 100 may be guided downwards through recirculation plenum 128 and out through lower modules 102 back into the ambient environment of the room where it displaces warmer air, causing air in the ambient environment to rise (e.g. into the upper modules).

Referring to FIG. 3, each module 102 also includes a damper panel 140. Damper panel 140 is between growth media port 110 and the at least one duct port 124 to obstruct the flow of fluid through the module 102. In the illustrated example, damper panels 140 cover growth media ports 110 and are behind the growth media assemblies 112. The damper panels 140 are each spaced from the growth media assemblies 112, such as to prevent any water flowing through the growth media assembly 112 from moving onto and/or through the damper panel 140. For example, the damper panel 140 may be spaced from the growth medial panel 116 by 1 to 5 centimeters.

A damper panel 140 may define an inlet to a downstream portion of a module plenum 104. The area of the inlet that is not closed by the damper panel may be a throughput aperture area of the inlet, and may govern the volume of fluid that can pass through the inlet. In the illustrated embodiment, the damper panel 140 of each module 102 is received in the growth media port 110, although in other embodiments it may be in other positions within module 102.

The damper panel 140 spans the port 110 with the perimeter of the damper panel 140 sealing against the inner rim of the port 110, and the throughput aperture area of the illustrated example is defined by apertures through the damper panel 140. In other embodiments, a damper panel 140 may be positioned with gaps between the damper panel 140 and walls of module body 104 to allow some fluid flow past a perimeter of damper panel 140.

The size and/or number and/or position of apertures through and/or around a damper panel 140 may affect the throughput aperture area of the inlet, and the volume of fluid that flows through the inlet and through module 102. Illustrated damper panel 140 is a planar panel to span a plane within module 102, however in some embodiments a damper panel 140 may be non-planar to define a throughput aperture area in a non-planar inlet.

A damper panel is provided to control the throughput aperture area, such as to compensate for distance to a blower. In the illustrated example, a damper panel 140 of a top module 102 may define a greater throughput aperture area than a damper panel 140 of a module 102 proximate the blower 132. Proximate module 142 has a damper panel 140 that defines a lesser throughput aperture area than the damper panel 140 of distal module 144.

In the illustrated example, the modules 102 are arranged in a column 126 and separated by a single blower assembly 134. However, in some embodiments modules 102 may be fluidly connected to side or rear modules 102 and/or columns 126 may be fluidly connected. In some embodiments, more than one blower 132 or blower assembly 134 may be within a recirculation plenum 128, and distal and proximate portions of a fluidly interconnected set of modules may be determined by average distance from a blower, average pressure differential across an inlet, or similar.

In the illustrated example, the proximate and distal portions of the living wall system 100 are separate modules 142, 144, however in some embodiments they may be portions of modules 102, such as portions of the same module 102. For example, a blower 132 may be a fan separating a single module 102 from another single module 102, with each module having a distal portion and a proximate portion having a shorter fluid flow distance to the blower 132 than the distal portion. Each of the distal and proximate portions may have a throughput aperture area which is a portion of the total throughput aperture area defined by the damper panel. A larger distal portion throughput aperture area may compensate for a greater fluid flow distance to the blower 132 and increase the volume of fluid that flows through the distal portion.

In some embodiments, air may be treated by a system or method using living wall modules. The air may be drawn through a growth media bearing a plurality of plants and then forced out through a second separate growth media bearing a plurality of plants. For example, air may be drawn through one module having a growth media port closed by a growth media, and then pushed out through a second separate module having a growth media port closed by a growth media.

The air flow path of a treatment system or method may be restricted to moving in through a first growth media port and out through another, with the passage between the two ports closed to an ambient environment. For example, the a first living wall module and a second living wall module may each enclose a plenum which is fluidically sealed except for a growth media port and one or more duct ports. Provided duct ports are either connected to other living wall modules or closed by stoppers, the air flow may be restricted to passing through the growth media ports. The growth media ports may be closed by growth media so that air passes through the growth media to be treated.

Figure 5:
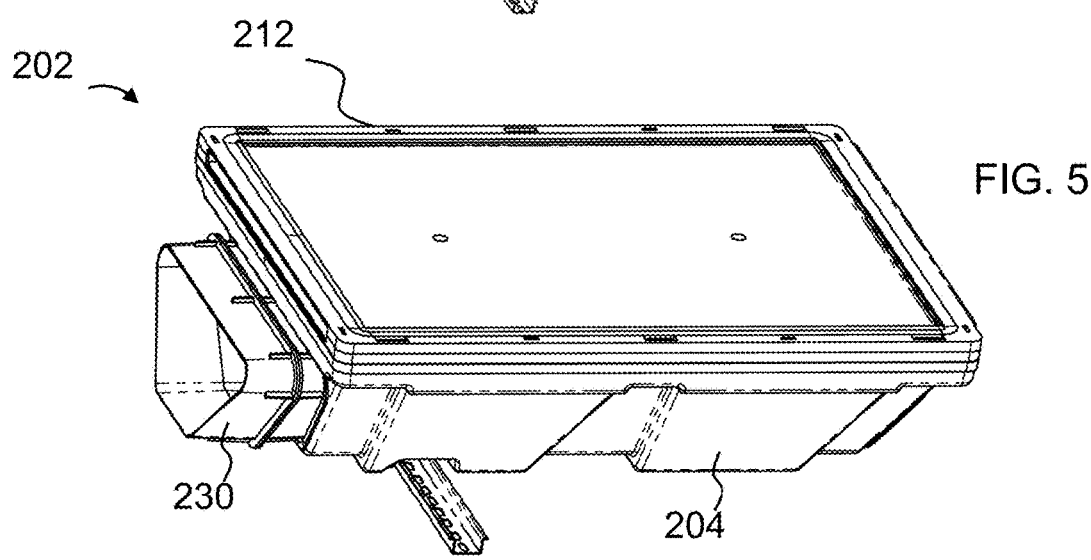
FIG. 5 is a front perspective view of a living wall module in accordance with an embodiment.

Referring to FIG. 5, illustrated is a living wall module 202 which may be used alone or as part of a living wall system such as living wall system 100. Living wall module 202 is similar in many respects to living wall module 102, and like components are indicated by like reference numbers, incremented by 100.

Module 202 has a body 204 enclosing a module plenum 222 and defining an axis 223. Body 204 forms upper and lower duct ports 224 and a growth media port 210. The upper duct port 242 is illustrated inline with a system coupling 230 to join the duct port 224 to another system component, while the lower duct port 242 is illustrated inline with a cap 243 to close off the lower duct port 242. The cap 243 may also include an impact absorbing material or a sealing material such as a soft rubber. The front of illustrated module body 204 is wider than the back, with the width of module body 204 tapering steadily narrower between the front and back. A tapered structure may allow modules of adjacent columns to be angled relative to one another, such as to form a system of modules around a curved surface such as a column.

A system coupling 230 is provided to join duct ports 242 of modules 202. In the illustrated embodiment, the system coupling 230 is inline to join a module 202 to a stand-alone blower assembly 234, but a system coupling may also or alternatively include a blower (e.g. a fan) to move fluid through the system coupling without the need for a stand-along blower assembly. A shape of system coupling 230 may reflect the shape of module body 204, such as being tapered to mirror the tapering of module body 204.

Figure 6:
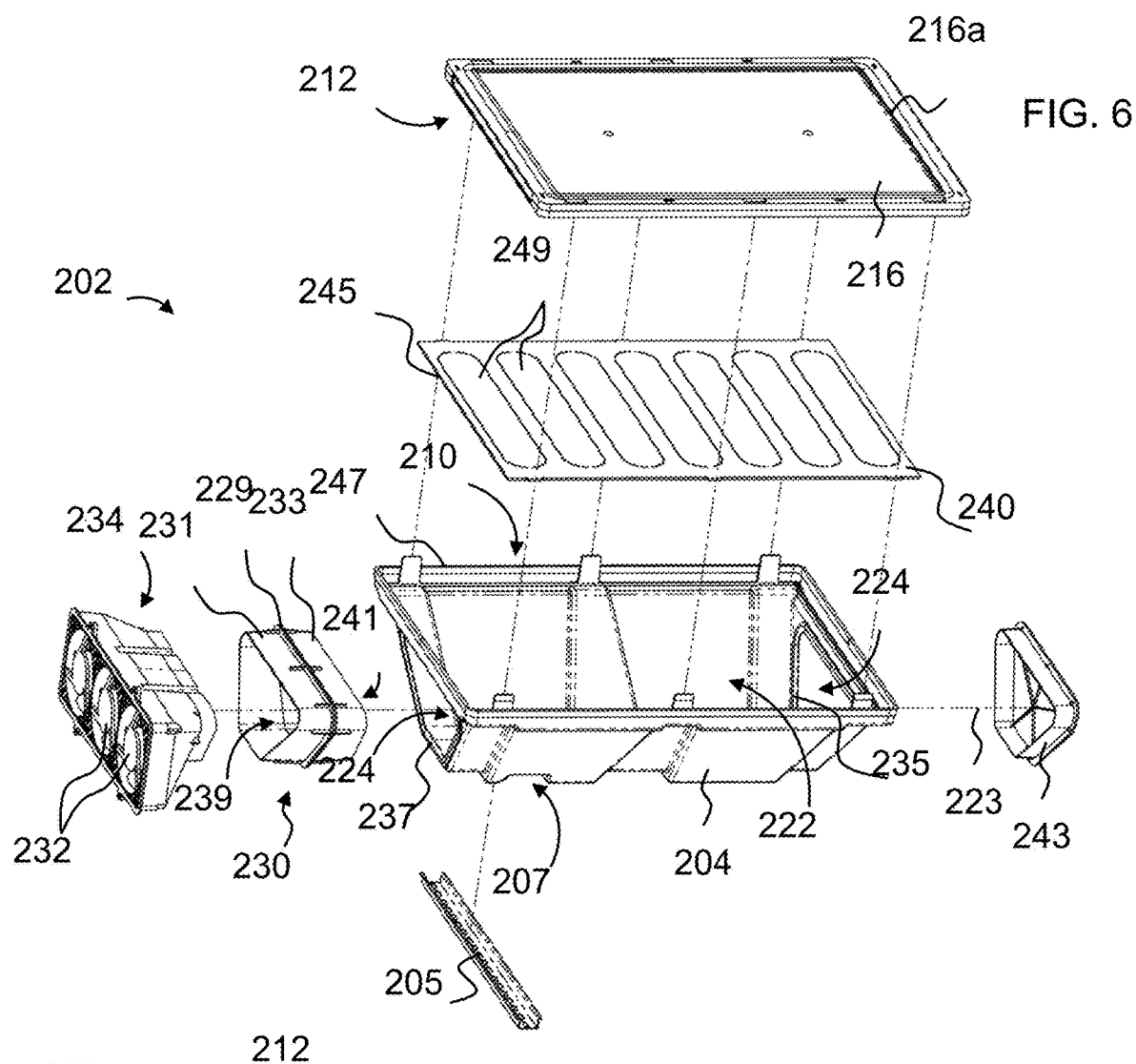
FIG. 6 is an exploded view of the living wall module of FIG. 5, along with a fan unit.

While a blower could be received in a recirculation plenum, a blower can also be outside the recirculation plenum and fluidly joined to the recirculation plenum to cause fluid movement therein. The blower 232 of FIG. 6 is joined to the module plenum 222 through coupling 230 but is outside the module plenum 222. If module 202 were to be joined to another module 202 below the illustrated module 202 and the two module plenums 222 joined to form a recirculation plenum, the blowers 232 could be joined to the recirculation plenum to cause fluid movement therein. For example, the illustrated blower assembly 234 could be joined to a set of interconnected modules 202 to draw air from the interconnected plenums 222 or push air into the interconnected plenums 222. In some embodiments, interconnected plenums 222 may be joined to an external system, such as the HVAC system of a building in which the modules 202 are mounted.

In some embodiments a system coupling 230 may join one module 202 to another module 202, and a blower assembly 234 may be integrated into or include a system coupling 230. System coupling 230 includes a coupling body 229 forming a first coupling engaging surface 231 and a second coupling engaging surface 233. Similarly, module body 204 includes a first duct port engaging surface 235 and a second duct port engaging surface 237. In the illustrated embodiment, the body 229 of system coupling 230 forms a section of ducting extending between a first end port 239 and a second end port 241 to join duct ports 242 of adjacent modules 202 when the duct ports 242 are separated by a short distance.

The coupling 230 may be used to join a module 202 with another module 202 when the first coupling engaging surface 231 interfaces with the first duct port engaging surface 235 of one module 202 and the second coupling engaging surface 233 interfaces with the second duct port engaging surface 237 of the other module 202. The system coupling 230 is partially inserted into module 202 and the system coupling 230 may be hidden behind the front faces of modules 202, such as where modules 202 have a front face that extends axially beyond a duct opening 224.

In some embodiments a coupling 230 is a manifold to join more than two duct ports or to join duct ports of modules 202 that are not axially aligned. For example, a coupling manifold may have a rear, forward or side opening or port to be fluidly connected to another module or to be connected to a duct port 224 of a module 202 that is in a rear or side of the module 202. A coupling manifold may create a flow paths in a variety of directions or locations. In some embodiments, a two or more couplings may also be joined to provide larger flow path extensions.

A system of modules may include an impact absorbing material, such as a soft plastic or rubber, to reduce noise due to vibration and/or to help seal the system of modules such as to reduce or eliminate water leakage. For example, when coupling 230 is used to join modules 202, at least one of the first coupling engaging surface 231 and the first duct port engaging surface 235 may be a first impact absorbing surface, and at least one of the second coupling engaging surface 233 and the second duct port engaging surface 237 may be a second impact absorbing surface. For example, first and second coupling engaging surfaces 233, 235 may be impact absorbing surfaces, such as if coupling 230 is made of a hard plastic and the surfaces 233, 235 are coated with a layer of rubber. An impact absorbing material may also help to block the sound of a blower, particularly when the blower is located within a recirculation plenum.

A damper panel 240 is provided to clip into growth media port 210. In other embodiments, damper panel 240 may be secured to body 204 in other ways, such as by a friction fit or threaded fasteners. Damper panel 240 is sized to cover the entire growth media port 210 with the perimeter 245 of the damper panel 240 sealing against a rim 247 of the growth media port 210. One or both of rim 247 and perimeter 245 may also be made of or coated with a sealing or impact absorbing material such as a soft rubber, to fluidly seal against one another. Damper panel 240 has a plurality of apertures 249, and since the damper panel perimeter 245 seals against the rim 247 the throughput aperture area defined by damper panel 240 is the area of the apertures 249.

A growth media assembly 212 is also illustrated to be clipped into growth media port 210 at a position spaced from damper panel 240 by a short separation distance. In other embodiments, growth media assembly 212 may be secured to body 204 in other ways, such as by a friction fit or threaded fasteners. The growth media assembly 212 includes a growth media panel 216 and a frame 214 supporting the growth medial panel 216.

Module body 204 may be mounted to a wall using rail 205. Rail 205 may be secured to a wall using a fastener, and module body 204 has a recess 207 to receive rail 205.

Referring to FIGS. 7 to 9, recess 207 is formed by an indentation 201 of body 204. This indentation 201 includes a hook 203 to ride upon a top of rail 205. A fastener may also be used to hold the hook 203 in position. For example, a threaded fastener 211 is shown in FIG. 7, and may be used to hold a bottom of indentation 201 in position below rail 205.

Figure 10:
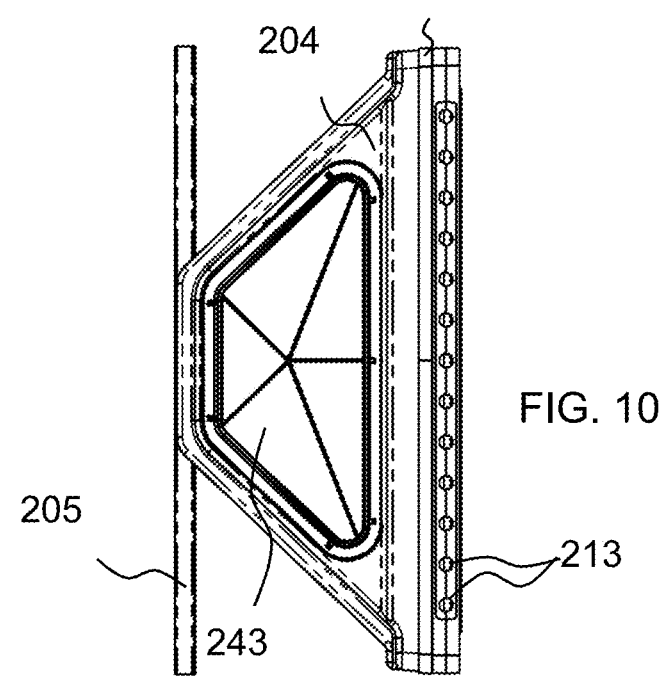
FIG. 10 is top plan view of the living wall module of FIG. 5.

Referring to FIG. 10, rail 205 is received in the indent of body 204, allowing body 204 to extend to or nearly to the surface to which rail 205 is secured. This may allow for greater fluid flow within body 204 or a less projected appearance of module 202 or a system of modules 202.

Also shown in FIG. 10 are a series of apertures 213 in the frame 214 of growth media assembly 212. Frame 214 of growth media assembly 212 may have apertures 213 in a top face as shown in FIG. 10 and also in a bottom face. Apertures 213 may permit the flow of liquid, such as a nutrient-enriched water, down from an upper module to a lower module. For example, the liquid may flow under the force of gravity down through the growth media panel 216 of a first module 202 through apertures 213 in a lower face of frame 214 of the first module 202 and then through apertures 213 in an upper face of frame 214 of a second module and down into the growth media panel 216 of the second module 202. Frame 214 may be tapered, such as from front to back, or otherwise shaped to direct the flow of fluids such as water or air.

Figure 11:
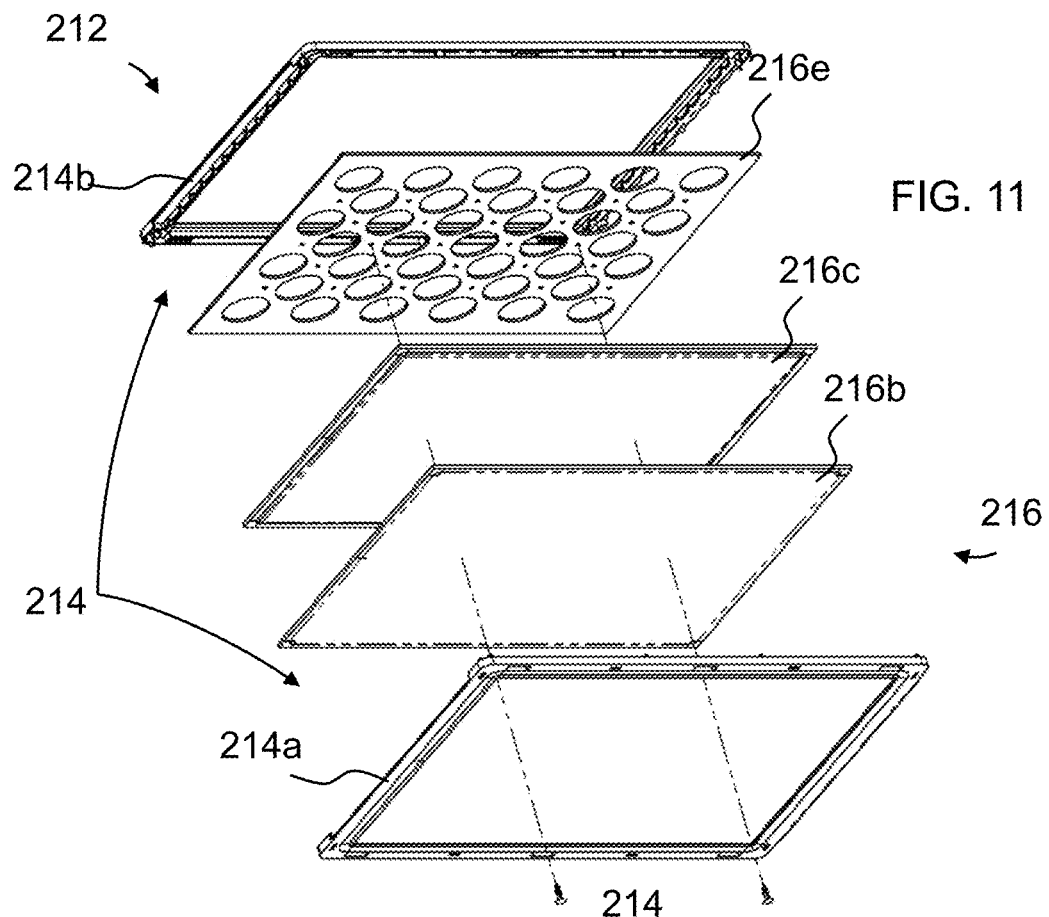
FIG. 11 is a perspective exploded view of the growth media assembly of FIG. 7.

Referring to FIG. 11, growth media assembly 212 is shown in greater detail. Growth media frame 214 includes a front half 214a and a rear half 214b which may be joined to hold a perimeter 216a (FIG. 6) of growth media panel 216 between them. Each of front and rear halves 214a, 214b of frame 214 may have indentations that meet up with indentations in the other half to form apertures 213.

Growth media panel 216 includes a first growth media sheet 216b and a second growth media sheet 216c. Illustrated panel 216 includes two sheets of growth media, but in other embodiments more or less sheets may be used, such as three sheets. A support sheet 216e is shown, and may give added rigidity to the growth media panel 216 and/or help to prevent water from moving further back into the module plenum. Growth media sheets may also be fastened at one or more positions to the support plate to improve the rigidity of growth media panel 216. The sheets of growth media panel 216 may each have a throughput area at least as large as that defined by the damper panel 240 so that the total throughput through growth media port 210 or any inlet of a module 202 is defined by the damper panel 240.

Sheets of growth media may be, for example, a porous synthetic foam. In some embodiments, plants may be installed by cutting a slits in one or more layers of growth media and inserting plant roots into an interior of growth media panel 216.

Figure 12:
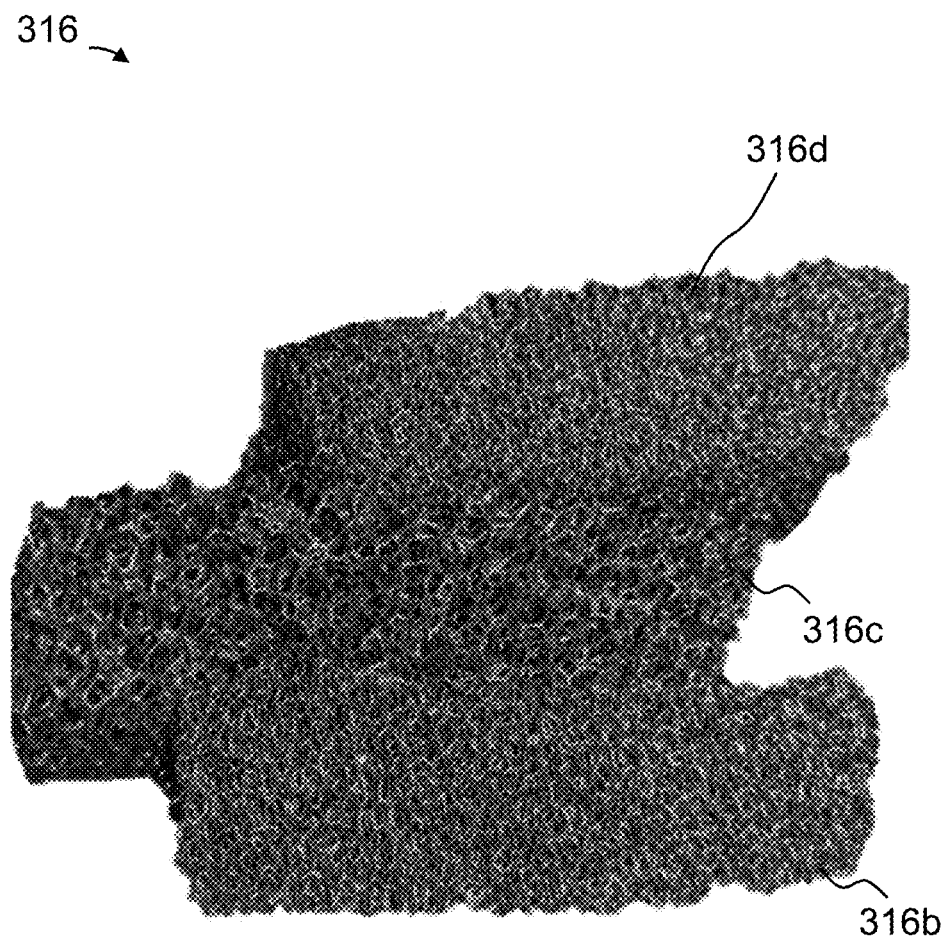
FIG. 12 is a perspective view of a growth media panel.

Referring to FIG. 12, illustrated is a growth media panel 316. Growth media panel 316 is similar in many respects to growth media panel 216, and like components are indicated by like reference numbers, incremented by 100. Growth media panel 316 includes three layers or sheets of growth media.

A growth media panel 316 has at least two sheets (e.g. polyether foam sheets) with different porosities. The sheets may be planar, and arranged co-planar in a layered fashion to form a growth media panel 316. The illustrated example growth media panel 316 includes a first polyether foam growth layer 316b having a first porosity, a second polyether foam growth layer 316c having a second porosity greater than the first porosity, and a third polyether foam growth layer 316d having a third porosity lesser than the second porosity. The second polyether foam growth layer 316c is sandwiched between the first and third polyether foam growth layers 316b, 316d.

In the illustrated example, the first, second, and third polyether foam growth layers 316b, 316c, 316d are each planar and they form a planar growth panel 316. The growth panel 316 may be supported along a periphery of the growth panel by a growth frame (not shown). The growth frame including at least one fastener to join the frame to a living wall module, such as a half of a clip to clip the frame to a module. A varied porosity between sheets may help to retain liquid such as water and may provide space for the roots of plants to grow without reshaping the panel 316 and/or to allow liquid to move.

Referring to FIGS. 13 and 14, illustrated is a growth media system 470. The growth media system 470 includes a living wall system 400. Living wall system 400 is similar in many respects to living wall system 100, and like components are indicated by like reference numbers, incremented by 300. Living wall system 400 includes a plurality of living wall modules 402 interconnected to form a recirculation plenum. Each of the living wall modules 402 includes a panel of growth media. The living wall modules 402 are arranged so that the living wall system 400 forms a living wall face 420. The living wall face 420 is an outside face of the living wall system on which living plants may grow. In the illustrated example, the living wall face 420 is a generally continuous surface of living wall modules, and the living wall face 420 incorporates all of the growth media panels of the living wall modules 402.

In some examples, the living wall system includes an irrigation system to provide water (e.g., tap water, filtered water, rain water, or water enriched with vitamins) to the growth media. This is exemplified in FIGS. 13 and 14, showing the growth media system 470 including the irrigation system 472. The irrigation system may include a reservoir for holding water prior to the water being provided to the growth media. In the illustrated example of FIGS. 13 and 14, each of the living wall modules 402 includes a panel of the growth media.

The irrigation system may also include a pump to pump the water out of the reservoir and onto the growth media and a conduit system from the reservoir to the growth media. In the example of FIGS. 13 and 14, the conduit system 480 includes an irrigation line 460 (e.g., a pipe). The irrigation line 460 runs between the water reservoir 462 at a bottom end 464 of system 400 to a top end 466 of system 400.

The illustrated example system 470 has the conduit system separate from the structure used to enclose the recirculation plenum (i.e., the separate irrigation line 460). However, the conduit system may also be integrated with the structure used to enclose the recirculation plenum. For example, the housing or body of the living wall system may form one or more channels and/or passages for water to pass through. In some examples, the conduit system 480 may include at least one passage formed in a wall of a body 404 of a living wall module 402 (e.g., a passage incorporating the apertures 213 discussed above and/or a passage extending all or part of the way from the reservoir to the top).

In some examples, the reservoir is also a collection chamber to collect excess water after the water has passed through the growth media. The irrigation line 460 is provided to carry liquid (shown as schematic droplets 461), such as nutrient-enriched water, from the reservoir 462 to the top of the system 400 to be gravity-fed through the modules 402 from one module 402 to another module 402 downwards back to the reservoir 462. The pump 468 is provided in fluid communication with the reservoir 462 to pump water through the irrigation line 460.

In some examples, the growth media system 470 is configured to adjust the humidity in a space. The growth media system 470 may adjust the humidity in a space by moving air past water that is in the growth media, and then redirecting the air into the space. For example, the system may blow air out through a damp growth media panel into the space. If the water in the growth media panel is above a threshold temperature (referred to as an increasing threshold temperature herein), the humidity of the space may be in increased (e.g., moisture added into the air, and the air then added into the space). If the water in the growth media panel is below a threshold temperature (referred to as a reducing threshold temperature herein), the humidity of the space may be reduced (e.g., moisture may be condensed out of the air, and the air then added into the space). The increasing and reducing threshold temperatures may be the same or different. One or both of the increasing threshold temperature and the reducing threshold temperature may be at or near the dew point (e.g., within one degree Celsius of the dew point or within 5 degrees Celsius of the dew point).

In the example of FIGS. 13 and 14, the growth media system 470 adjusts the humidity in a room by adjusting the temperature of the liquid used to irrigate the growth media of the system. The temperature of the liquid may be adjusted prior to being provided to the growth media (e.g., the temperature may be adjusted when the liquid is in the reservoir or in the conduit system). In the illustrated example of FIGS. 13 and 14, the growth media system 470 is operable to adjust the temperature of the liquid (shown as the schematic droplets 461) circulated by irrigation system 472. In the illustrated example, the living wall system 400 includes a temperature control unit 474 in fluid communication with the reservoir 462 to adjust the temperature of liquid in the reservoir 462.

In some examples, the temperature control unit is or includes a chiller unit to reduce the temperature of the liquid in the reservoir. In some examples, the temperature control unit is or includes a heater unit to increase the temperature of the liquid in the reservoir. In some examples, the temperature control unit does not include a heater, which may reduce the cost and/or complexity of the system. In some examples, ambient temperature water is used to increase humidity. However, a heater unit may allow for more rapid humidifying. In some examples, the greater the difference in temperature from the dew point, the faster the humidity will change, and the system may allow a user to choose how quickly they wish the humidity to change.

In some examples, the temperature control unit 474 is operable to adjust the temperature of the liquid to control whether the temperature of the liquid is above or below the dew point of the air in the space. For example, where the air in the space is at 21 degrees Celsius and has a relative humidity of 55%, the liquid in the reservoir may be kept at a temperature above 11.6 degrees Celsius to increase the humidity of the air in the space or kept at a temperature below 11.6 degrees Celsius to reduce the humidity of the air in the space.

In some examples, the temperature of the liquid changes as it moves out of the reservoir and to the growth media (e.g., due to heat being transferred to the conduit system). In some examples, the temperature of the liquid changes as it moves through the growth media and/or over time as it rests in the growth media (e.g., due to heat being transferred to the growth media and/or air). In some examples, the temperature of the liquid is kept at least 2 degrees, at least 5 degrees, or at least 10 degrees warmer than the dew point of the air in the space to increase the humidity. In some examples, the temperature of the liquid is kept at least at the ambient temperature of the air in the space or at least 2 degrees, at least 5 degrees, or at least 10 degrees warmer than the ambient temperature of the air in the space to increase the humidity. In some examples, the temperature of the liquid is kept at least 2 degrees, at least 5 degrees, or at least 10 degrees cooler than the dew point to decrease the humidity.

In some examples, the system adjusts the temperature of the liquid while the liquid is in the reservoir, as discussed above. For example, the temperature of the liquid may be adjusted by the temperature control unit 474 of the example of FIGS. 13 and 14. In some examples, the system only actively adjusts the temperature of the liquid while the liquid is in the reservoir (i.e., any further change in temperature is due to an ambient temperature). However, in some examples the system also, or alternatively, actively adjusts the temperature of the liquid elsewhere. For example, the conduit system may be heated or cooled. In some examples, the system does not actively adjust the temperature of the water (e.g., water of the desired temperature is provided to the system or the system uses ambient temperature water).

An example of a method 500 of controlling humidity is illustrated in FIG. 15. The method 500 includes, at step 502, adjusting the temperature of water. The water temperature may be adjusted to be below a dew point of the air in the space to reduce the humidity of the air. The water temperature may be adjusted to be above the dew point of the air in the space to increase the humidity of the air. The water temperature may be adjusted to be at least 2 degrees, at least 5 degrees, at least 10 degrees, at least 15 degrees or at least 20 degrees from the dew point.

The method 500 includes, at step 504, adding the liquid to the growth media of the growth media system after step 502. In some examples, step 504 may involve passing the water through the growth media of the living wall system (e.g., gravity driven irrigation). For example, the irrigation system of the living wall system may be used to pump water out of the reservoir and onto the growth media (e.g., onto an upper portion of the growth media to be drawn down through the growth media by gravity).

The method 500 includes, at step 506, moving air through the growth media after step 504. Step 506 may include moving the air through the growth media and then back into the space. For example, the blower of the living wall system may be used to draw air into the recirculation plenum of the living wall system through the growth media from where the air may move back into the space (e.g., through an HVAC system coupled to the recirculation plenum or out through an outlet of the recirculation plenum leading directly back into the space). In another example, the blower of the living wall system may push air out of the recirculation plenum through the growth media and into the space.

In some embodiments, one or more of a blower, blower assembly, irrigation pump, irrigation system or other components may be controlled automatically by a controller. A controller may include, for example, a processor programmed to adjust a volume of water pumped by the irrigation pump or the speed of a fan or other blower. In some embodiments, adjustments are made in response to commands or in response to sensed or input ambient or desired air quality or plant nutrient levels. For example, the system may increase an amount of air moved by the blower in response to a direction (e.g., command) to increase the air quality. In another example, the system may increase the amount of air moved by the blower in response to a sensed reduction in air quality outside a predetermined allowable threshold.

In some examples, the system has two or more modes of operation. The system may have an air purify and humidify mode, in which the system moves air through the growth media and ensures the growth media is damp (e.g., the blower and the pump are both operating). The system may have an air purify only mode, in which the system moves air through the growth media but does not actively ensure the growth media is damp (e.g., the blower is operating but the pump is off). The air purify only mode may be useful, e.g., when the user is in the house but wishes to save power or water by reducing water circulation. The system may have a water cycle mode, in which the system ensures the growth media is damp but does not actively ensure air is moving through the growth media (e.g., the blower is off but the pump is operating). The water cycle mode may be useful, e.g., when the user is not in the house but wishes to keep plants that are growing in the growth media alive. The system may have a standby mode, in which the system does not actively ensure the air is moving through the growth media or that the growth media is damp (e.g., the blower and the pump are both off). The standby mode may be used, e.g., when the user wishes to save water and/or power. The system may be operable to switch between modes in response to commands. The system may also or alternately be operable to switch between modes in response to sensed and/or input characteristics of the space (e.g., ambient air quality, desired air quality, ambient air humidity, or desired air humidity) or in response to sensed and/or input characteristics of the system itself (e.g., existing plant nutrient levels, desired plant nutrient levels, existing growth media saturation levels, or desired growth media saturation levels).

A processor may be, for example, coupled to a machine-readable media storing instructions to direct the processor. The processor may also be communicatively coupled to one or more of a blower, a pump, or other adjustably-operable equipment component to direct the operation of the equipment component. The instructions may be, for example, for the processor to monitor or sense air quality and detect an air quality below or above an acceptable range. The processor may also or alternatively receive direct instruction from a pre-determined schedule such as a nutrient supply schedule or from an operator using an input device communicatively coupled to the processor. The processor may respond by changing the speed of a fan, dispensing a nutrient to a water reservoir, increasing a pump speed, or indicating a warning such as a flashing light.

The invention claimed is:

1. A living wall system for supporting living plants, comprising:
   a. a plurality of living wall modules, each living wall module having a module body enclosing a module plenum, the module body having a growth media port and at least one duct port in fluid communication with the growth media port via the module plenum, the plurality of module plenums interconnected through the plurality of duct ports to form a recirculation plenum;
   b. growth media mounted to the living wall module for supporting living plants, the growth media disposed between the growth media port and ambient air in an environment external the living wall module; and
   c. at least one directional blower received within the recirculation plenum, the at least one directional blower mounted between at least one upstream living wall module and at least one downstream living wall module to draw the ambient air through the growth media and growth media port of the upstream living wall module into the recirculation plenum, and to expel air from the recirculation plenum to the environment through the growth media port and growth media of the downstream living wall module.

2. The living wall system of claim 1, further comprising a growth media panel mounted to each module body and at least partially covering the growth media port, the growth media supported by the growth media panel.

3. The living wall system of claim 1, wherein the at least one directional blower is at least one electric fan received in at least one of the at least one duct ports.

4. The living wall system of claim 1, wherein the recirculation plenum is fluidly sealed except for the plurality of growth media ports.

5. The living wall system of claim 4, wherein each module plenum is fluidly sealed except for the growth media port and the at least one duct port.

6. The living wall system of claim 1, wherein:
   the living wall system further comprises a damper panel defining a throughput aperture area between the growth media port and the at least one duct port;
   the plurality of living wall modules include a proximate portion a proximate fluid flow distance from the blower and a distal portion a distal fluid flow distance from the blower, the distal fluid flow distance being greater than the proximate fluid flow distance, the proximate portion having a proximate portion throughput aperture area that is smaller than a distal portion throughout aperture area of the distal portion.

7. The living wall system of claim 6, wherein each damper panel of the plurality of living wall modules is a planar panel closing the module plenum between the growth media port and the at least one duct port, and the throughput aperture area of each living wall module is defined by a set of apertures in the damper panel.

8. The living wall system of claim 7, wherein the apertures of the set of apertures of the adjacent living wall module are smaller than the apertures of the set of apertures of the distal living wall module.

9. The living wall system of claim 7, wherein the apertures of the set of apertures of the adjacent living wall module are less numerous than the apertures of the set of apertures of the distal living wall module.

10. The living wall system of claim 1, further comprising:
    an irrigation system to deposit water on the plurality of living wall module, the irrigation system including:
    a reservoir to hold the water;
    a conduit system from the reservoir to the plurality of living wall modules;
    a pump to move the water out of the reservoir and through the conduit system to the plurality of living wall modules; and
    a temperature control unit in thermal communication with the water in the reservoir to selectively cool or warm the water in the reservoir.

11. The system of claim 10, wherein the temperature control unit includes a chiller operable to cool the water in the reservoir.

12. A living wall system for supporting living plants, comprising:
    a. a first living wall module having a first module body forming a first module plenum, the first module plenum having a first growth media port and a first duct port, the first duct port having a first duct port engaging surface;
    b. a second living wall module having a second module body forming a second module plenum, the second module plenum having a second growth media port and a second duct port, the second duct port having a second duct port engaging surface; and
    c. a system coupling joining the first duct port and the second duct port for joining the first module plenum and the second module plenum into a recirculation plenum, the system coupling having a coupling body having a first coupling engaging surface for interfacing with the first duct port engaging surface and a second coupling engaging surface for interfacing with the second duct port engaging surface; and
    at least one of the first coupling engaging surface and the first duct port engaging surface being a first impact absorbing surface, and at least one of the second coupling engaging surface and the second duct port engaging surface being a second impact absorbing surface.

13. The living wall system of claim 12, wherein the system coupling includes a section of ducting extending between a first end port and a second end port, each of the first and second end ports having a port interface coated with an elastic vibration dampening material.

14. The living wall system of claim 12, wherein the system coupling includes a blower to drive fluid through the system coupling.

15. The living wall system of claim 12, further comprising, for each module body, a growth media panel mounted to the module body and at least partially covering the growth media port, the growth media supported by the growth media panel.

16. The living wall system of claim 12, further comprising at least one directional blower received within the recirculation plenum, the at least one directional blower mounted between at least one upstream living wall module and at least one downstream living wall module to draw the ambient air through the growth media and growth media port of the upstream living wall module into the recirculation plenum, and to expel air from the recirculation plenum to the environment through the growth media port and growth media of the downstream living wall module.

17. The living wall system of claim 16, wherein the at least one directional blower is at least one electric fan received in at least one duct port.

18. The living wall system of claim 16, further comprising:
for each wall module, a damper panel defining a throughput aperture area between the growth media port and the duct port; and
a plurality of living wall modules including the first wall module and the second wall module, the plurality of living wall modules including a proximate portion a proximate fluid flow distance from a directional blower of the at least one directional blower and a distal portion a distal fluid flow distance from the blower, the distal fluid flow distance being greater than the proximate fluid flow distance, the proximate portion having a proximate portion throughput aperture area that is smaller than a distal portion throughout aperture area of the distal portion.

19. The living wall system of claim 18, wherein each damper panel of the plurality of living wall modules is a planar panel closing the module plenum between the growth media port and the duct port, and the throughput aperture area of each living wall module is defined by a set of apertures in the damper panel.

20. The living wall system of claim 12, further comprising an irrigation system to deposit water on the living wall modules, the irrigation system including:
a reservoir to hold the water;
a conduit system from the reservoir to the living wall modules;
a pump to move the water out of the reservoir and through the conduit system to the living wall modules; and
a temperature control unit in thermal communication with the water in the reservoir to selectively cool or warm the water in the reservoir.

* * * * *